United States Patent [19]
Jensen

[11] Patent Number: 5,117,094
[45] Date of Patent: May 26, 1992

[54] HEAT RECOVERABLE ARTICLE

[75] Inventor: Per J. T. Jensen, Slangerup, Denmark

[73] Assignee: Raychem Corporation, Menlo Park, Calif.

[21] Appl. No.: 242,089

[22] Filed: Sep. 8, 1988

[30] Foreign Application Priority Data

Sep. 9, 1987 [GB] United Kingdom ................ 8721181
Oct. 9, 1987 [GB] United Kingdom ................ 8721180
Oct. 9, 1987 [GB] United Kingdom ................ 8723760
Oct. 9, 1987 [GB] United Kingdom ................ 8723761

[51] Int. Cl.$^5$ ............................................. H05B 3/00
[52] U.S. Cl. ................................................. 219/535
[58] Field of Search ................ 219/535; 264/230, 249, 264/27; 156/49, 86; 174/DIG. 8

[56] References Cited

U.S. PATENT DOCUMENTS

4,775,501 10/1988 Rosenzweig ........................ 219/535

Primary Examiner—Roy N. Envall, Jr.
Attorney, Agent, or Firm—Timothy Richardson; Herbert Burkard

[57] ABSTRACT

A heat recoverable conductive polymeric tubular article shrinks radially when electrical current is passed therethrough. It is powered by elongate electrodes extending along the article along part of the length only of the article, thereby defining an inwardly directed electrode end material of the article preferably has specific electrical properties to compensate for the increased current density that would otherwise exist at the inwardly directed electrode end, and which could lead to burning or hot spot formation.

15 Claims, 2 Drawing Sheets

HEAT RECOVERABLE ARTICLE

This invention relates to a heat recoverable article which comprises a conductive polymeric material, wherein the heat to effect recovery is provided by passing electrical current through the conductive polymeric material.

A heat-recoverable article is an article the dimensional configuration of which may be made substantially to change when subjected to heat treatment. Usually these articles recover, on heating, towards an original shape from which they have previously been deformed, but the term "heat-recoverable", as used herein, also includes an article which, on heating, adopts a new configuration, even if it has not been previously deformed.

Heat recoverable articles are known. In their most common form, such articles comprise a heat-shrinkable sleeve made from a polymeric material exhibiting the property of elastic or plastic memory as described, for example, in U.S. Pat. Nos. 2,027,962, 3,086,242 and 3,597,372. As is made clear in, for example, U.S. Pat. No. 2,027,962, the original dimensional heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In other articles, an elastomeric member is held in a stretched state by a second member, which, upon heating weakens and thus allows the elastomeric member to recover. Heat-recoverable articles of this type are described, for example, in British Patent 1,440,524 in which an outer tubular elastomeric member is held in a stretched state by an inner tubular member.

Conductive polymers and devices comprising conductive polymers are well known. Reference may be made, for example, to U.S. Pat. Nos. 4,534,889, 4,560,498, 4,545,926 and 4,775,501 which all describe conductive polymers, that is, an organic polymer, or blend of organic polymers, having dispersed or distributed therein conductive particles, for example carbon black. The term "organic polymer" means any polymer which contains carbon in the backbone and/or the side chains, including, for example, polymers of olefinic monomers, polyamides, polyesters, polyacrylates, polyimides, polycarbonates and polysiloxanes.

Heat recoverable articles which comprise conductive polymeric materials, and which use those materials to provide the recovery heat are also known. Reference may be made for example to GB 1265194, U.S. Pat. Nos. 4,085,286, 4,017,715, 4,421,582, European Patent Publication No. 0157640 and U.S. Pat. No. 4,570,055.

Two early patent publications describing conductive, recoverable polymeric articles are GB 1265194 (Cook) and T905001 (U.S. defensive publication to Day). GB 1256194 describes a conductive polymeric, optionally shrinkable tubular layer, which is optionally used in conjunction with a non-conductive shrinkable tubular layer. Current is supplied to the conductive layer, to pass electric current therethrough, by alligator clips or other conventional clamps or electrodes. T905001 describes a heat shrinkable plastics packaging bag, which has a conductive coating or contains conductive particles. The bag is lowered over a pallet to be convered and vertical electrodes attached to diagonally opposite vertical seams of the envelope and powered to cause current to flow between the electrodes to shrink the bag. In both Cook and Day the current flows, as in the present invention, in or parallel to the plane of the article.

It is also known to be desirable to use for a conductive recoverable article, a material which exhibits a PTC (positive temperature coefficient of resistivity) effect, that is a sharp rise in resistivity at a particular, or over a short range of temperatures. This temperature or temperature range is known as the anomaly or switching temperature. Typically the material is selected to exhibit the sharp rise in temperature at or slightly above the recovery temperature of the article. The PTC effect minimises overheating and consequent so-called "thermal runaway" of the material. Materials which exhibit a PTC effect are typically referred to simply as PTC materials.

U.S. Pat. No. 4,085,286 describes in a preferred embodiment (FIGS. 8 to 11) a splice case comprising upper and lower members which come together to enclose the splice. The ends only of the upper member are heat recoverable and can be shrunk down to seal the exiting cables. The ends of the upper member are provided with electrodes which can be powered to cause current to flow through the conductive material to provide the heat for recovery. The electrodes are flexible and compliant and embedded in the conductive polymeric material at the splice case ends. The arrangement described uses three electrodes of each polarity at each end positioned on opposite sides of the thickness of the material and extending transversely to the longitudinal axis of the splice. The current therefore flows through the thickness of the sleeve.

European Patent Application Publication No. 0157640 describes a heat shrinkable, conductive polymeric article which can be used as a pipe coupler. The article described is tubular and is provided with annular electrodes at each of its ends to cause current to flow along the length of the article in a direction substantially parallel to the surface of the article.

We have discovered an article, to which electrodes are or can be connected so that the current flows substantially parallel to the surface of the article, in which the position of the electrodes, preferably in combination with the electrical characteristics of the article and/or the geometry of the part, are arranged so that current flows preferentially through a selected portion of the article.

A first aspect of the invention provides a heat recoverable article comprising a conductive polymeric cover, at least part of which has been expanded to render it heat recoverable, the cover being specificially adapted so that two or more electrodes can be connected thereto, or additionally comprising two or more electrodes, in a position along part only of the article so that (a) when they are connected to a source of electrical power, current flows between the electrodes in a direction substantially parallel to the surface of the article, and (b) at least one end of at least one electrode terminates in a body of conductive polymeric material.

Where the article does not itself comprise electrodes these may be applied later, in the field. It may be specifically adapted for such electrodes to be added. For example it may comprise lugs or flanges for the attachment of electrodes such as silver paint strips, or conductive wires thereto. Crocodile clips or the like may be attached to the electrodes.

When we say an electrode terminates "in" a body of material we mean that an end of the electrode is in contact with a region of the material which is not at a free end of the article. In this specification this electrode end, not at the free end of the article, is referred to as the inwardly directed electrode end.

An example of an article according to the invention is a tubular or wraparound article in which longitudinal electrodes are arranged on opposite sides of the article extending part way only along the length of the article. The tubular article may be closed in cross-section, or open in cross-section (wraparound). When tubular articles are used they may be open at one or both ends.

In preferred articles according to the invention a selected portion of the article is preferentially expanded. In the above example of a tubular article the part of the article between the electrodes is preferentially expanded, i.e. expanded more than the part extending beyond the electrodes. The less expanded part may be zero expanded.

Preferably the article is arranged so that the resistance to current flow at the inwardly directed electrode end(s) is greater than the resistance to current flow adjacent the main length of the electrode(s), thereby diverting current away from the inwardly directed electrode end, which might otherwise be expected to be a point of current density concentration, and as such a possible point of hot spot generation and overheating.

We have found that some conductive polymeric materials exhibit a decrease in resistivity when expanded and that this feature, together with preferential expansion of the article can be used to produce a higher resistance to current flow at the inwardly directed electrode end(s) than in the adjacent parts of the article. Thus in preferred embodiments according to the invention, at least before recovery, the material adjacent the inwardly directed electrode end(s) is less expanded than the material adjacent the main length of the electrode(s), and the material of the article has a resistivity which decreases, in at least part of the expansion range, when expanded.

Preferably a material which decreases its resistivity, does so in at least part of the expansion range when expanded by at least 25%, more preferably from 25% to 300%, or even 25% to 500%. This means that at least when the current is initially switched on the resistivity of the material adjacent the inwardly directed electrode end(s) is greater than that adjacent the main body of the electrode(s). This factor (in the absence of opposed geometric considerations) tends to shunt current away from the inwardly directed end and to the region of lower resistivity.

The resistance between the electrodes is determined not only by the resistivity of the material, but also by the geometry of the part, (the resistance being lower the closer the electrodes and the thicker the walls). Thus the resistivity behaviour of the material is preferably arranged to overcome any geometry considerations which might tend to shunt the current towards the inwardly directed electrode end(s).

Geometry considerations may be arranged to work together with, or instead of, resistivity characteristics to increase the resistance in the current path between the electrodes at the inwardly directed electrode end and hence to shunt or assist shunting current away from the inwardly directed ends. Thus in preferred embodiments according to the invention, the article is arranged to have thinner walls adjacent the inwardly directed electrode ends than adjacent the main body of the electrode. Thinning of the walls decreases the area for current flow and hence increases the resistance to current flow. In a particularly preferred embodiment the thin walled section is arranged in a convoluted manner. This advantageously provides flexibility to the article.

Another electrical characteristic of the material that can be employed to compensate for any increased current density adjacent the electrode end is to use a conductive polymeric material which exhibits a slight PTC effect (positive temperature coefficient of resistivity). This means that when current flows the article heats, and its resistance increases. In particular, where a preferentially expanded material is used, it is preferred that the PTC behaviour is less pronounced in the more expanded material than in the less expanded material. Thus if current is concentrated at the inwardly directed electrode ends the regions of material adjacent those inwardly-directed electrode ends will heat more quickly and be of higher resistivity than adjacent regions. This will cause current to be diverted from the region immediately adjacent the electrode ends and thus minimise the possibility of the formation of hot spots.

PTC materials exhibit a sharp rise in resistivity with temperature, and then typically exhibit a curl-over effect. This means the resistivity reaches a so-called "peak" after which it then falls, levels off, or changes its slope, sometimes with a subsequent rise in resistivity. Preferred compositions for use in the present invention exhibit a small, but nonetheless present, increase in resistivity at or about a critical temperature. This is referred to herein as a pseudo PTC effect. For quantitative purposes we define herein a pseudo PTC ratio, this being the ratio of the peak resistivity to the resistivity at 25° C. The peak resistivity is the highest resistivity where curl-over with a decrease in resistivity (referred to herein as negative curl-over) occurs, or the point of inflection where a subsequent rise occurs (referred to herein as positive curl-over).

In preferred articles according to the present invention, the material (at least in the most expanded region if preferentially expanded), before recovery, preferably exhibits a PTC ratio in the range 1½ to 50, more preferably in the range 1½ to 10; especially preferably in the range 1½ to 5.

The above quoted PTC ratios are for the material of the expanded recoverable part. Such a material has already been heated once in order to deform the material to render the article recoverable. This distinction is important since the initial heating to deform step may significantly alter the pseudo PTC behaviour of the material seen on subsequent heating. Thus the pseudo PTC ratios quoted are from resistivity vs temperature curves obtained during heating of materials that have already been heated once in the expansion process.

The pseudo PTC ratio after recovery is preferably at least 8.

Preferred articles according to the present invention have the electrical properties of the articles described in U.S. patent application Ser. No. 07/242,081 filed contemporaneously herewith (the disclosure of which is incorporated herein by reference).

One article according to U.S. patent application Ser. No. 07/242,081 comprises a laminar article at least part of which has been expanded from X% to Y% to make it heat recoverable, the article comprising a conductive polymeric material the resistivity of which decreases on expansion, as measured in the direction of current flow, in at least part of the X−Y% expansion range.

X may be zero or finite, and Y is greater than X.

Another article according to application DK005 comprises a laminar article at least part of which is heat-recoverable, comprising a conductive polymeric material which has a resistivity which increases on recovery, as measured in the direction of current flow, throughout the temperature range 20° C. to $T_e$ (extrapolated end temperature as measured according to ASTM 3418-82).

Preferred articles according to that invention are expanded to render them recoverable, and the resistivity of the composition preferably decreases on expansion especially when expanded by more than 25%.

Any suitable electrodes can be used. The electrodes may be applied to the surface of the conductive polymeric material. As examples of such surface-applied electrodes there may be mentioned silver paint strips (applied by painting), thermally sprayed metals (applied by flame or arc spraying), electroless or electroplating, and metal strips secured to the surface, e.g. by conductive adhesive. The electrodes may be embedded in the conductive polymeric material. As examples of embedded electrodes there may be mentioned wires, braids or meshes. Penetrative electrically conductive crimps (e.g. toothed crimps) may also be used which penetrate the conductive material of the article.

One embodiment uses elongate electrodes extending along the length of the article to be radially shrinkable.

In a preferred embodiment the electrodes are provided on or in support elements which also comprise conductive polymeric material which are preferably integrally formed with the article, and which remain substantially undeformed on recovery of the article, other than bending to accommodate transitions. The support elements may be in the form of flanges. This is described in U.S. patent application Ser. No. 07/241,749, the entire disclosure of which is incorporated herein by reference. Where the electrode is provided on or in such a support element current passes from the electrode to the conductive support element and then to the main body of the article. Since the electrode is in direct contact with the conductive polymeric material of a part which does not deform, or deforms only minimally, on recovery there is no danger of contact between the electrode and conductive polymeric material being broken during recovery. In other cases the support element can provide contact to a clamp or similar type connector.

The article according to the invention is preferably tubular, for example cylindrical. Preferably it is radially recoverable, especially radially shrinkable. In this case the electrodes are preferably provided so that electrical current flows around the circumference of the tube.

A preferred embodiment is tubular and expanded more at one or both ends than in the remainder of the article (which may be zero or less expanded). One or more longitudinal electrodes of opposite polarity are provided on opposed sides of the article substantially only along the most expanded portion or portions. The electrodes are preferably provided in or on heat-stable longitudinal flanges. The material of the expanded article, prior to recovery, preferably exhibits a pseudo PTC ratio of 1½ to 10 and decreases in resistivity when expanded by more than 25%. The electrodes are preferably extended slightly into the lesser expanded region where the resistivity is consequently higher. The wall thickness of the less-expanded region, at least immediately adjacent the inwardly directed electrode ends is preferably thinner, than that adjacent the main body of the electrode, to increase the resistance to current flow. The thin walled section may be convoluted.

Another preferred article comprises a tubular article deformed significantly more at each end than at the central intermediate section. The deformation may be the same or different at each end. This article is preferably electroded by separate pairs or multiples of electrodes at each end, but not at all in the intermediate section. The inwardly directed electrode ends do however preferably extend a short distance into the intermediate section. In this case the electrodes at either end of the article are preferably powered separately by separate power sources, but may be powered together. Where powered separately they may be powered by the same or different voltages, simultaneously, or at or for different times.

Preferred articles according to the invention are tubular. The tubular articles may be integrally formed closed in cross-section. As an alternative the articles may be open in cross-section (wraparound). As used herein the term "wraparound" means a cover which can be wrapped around a substrate and longitudinal edges secured together to form a tubular article around the substrate. Wraparound covers may be closed in any suitable way. For example upstanding flanges which can be held together by clamps or by a channel shaped closure may be provided at or near the longitudinal edges. Longitudinal electrodes may be included in the upstanding flanges, or at the base thereof, and/or extending along part of the main body of the cover. A wraparound cover can conveniently be made by extrusion. The electrodes can be embedded in the cover during the extrusion process.

Preferably the materials used and the arrangement of the electrodes and article geometry are such that sufficient heat can be generated to effect recovery using a 70 V power source or less.

Articles according to the invention may be used in a number of areas, and a number of ways, including those described in the following patent applications, the disclosures of which are incorporated herein by reference.

U.S. patent application Ser. No. 07/242,089 describes a tubular conductive polymeric article which has particular application as a duct seal, and which increases in thickness on recovery. It preferably has three longitudinal sections which are electroded, heated and shrunk separately. The ends sections are preferably radially shrinkable, and comprise longitudinal electrodes which terminate towards the centre of the article, in a body of conductive polymeric material.

U.S. patent application Ser. No. 07/241,658 describes a tubular conductive polymeric article with longitudinal electrodes interrupted along their length, allowing separate longitudinal sections to be powered independantly. The interrupted electrodes typically have an end terminating in a body of material.

U.S. patent application Ser. No. 07/241,643 describes a tubular article which is preferably heat recoverable and which can apply a radially inward force on a substrate therein. This can be used to join or repair a substrate e.g. a cable or a pipe. It can for example melt a polymeric patch positioned between the article and the substrate. It is preferably multipart or wrap around for easy installation. The electrodes may end part way along its length.

A number of suitable materials may be used in the present invention. Suitable materials are described in Table 1 of contemporaneously filed application (Ser. No. 07/242,081), the entire disclosure of which is incorporated herein by reference. One particular example that may be mentioned here comprises an ethylene vinyl acetate resin, Elvax 460 (Trade Mark) 59.4 parts by weight, a carbon black filler, Vulcan P (Trade Mark) 39.6 parts by weight and an antioxidant 1 part by weight. Elvax 460 is an ethylene vinyl acetate polymer containing 18% by weight vinyl acetate and having a melt flow index of 2.5.

Other suitable examples are:

| Polymer (parts by weight) | Carbon black (parts by weight) | Antioxidant (parts by weight) |
| --- | --- | --- |
| Marlex* HXM50100 (59.4) | Vulcan P* (39.6) | (1.0) |
| Elvax* 460 (59.4) | Sevalco N110* (39.6) | (1.0) |
| Sclair* 11D-1 (59.4) | Ensaco* MS (39.6) | (1.0) |
| Elvax* 770 (59.4) | Vulcan P* (39.6) | (1.0) |

The polymeric materials used are as follows:
Marlex HXM 50100 is a HDPE supplied by Phillips.
Elvax 460—described earlier.
Sclair 11D-1 is a LLDPE supplied by Du Pont, Canada.
Elvax 770 is an EVA supplied by Du Pont.

Vulcan P, Ensaco MS, and Sevalco N110 are supplied by Cabot Corporation, Ensagri Willebroek NV and Sevalco Ltd respectively.

The above compositions may conveniently be prepared using a one-liter charge size internal mixer.

The materials of articles according to the invention are preferably cross-linked before expansion to enhance recoverability. This is preferably done by irradiation e.g. using a beam dose of 2-35 MRads, especially 2-25 MRads, for example 10 or 15 MRads.

Where articles are molded, the cross-linking may also be effected chemically. In this case a single step process can be used to mold and cross-link the material of the article. Such parts formed by molding, e.g. transfer molding, injection moulding can have complex shapes. As an example multi-outlet tubular shapes, for example Y outlets can be made.

One preferred article according to the invention is a tubular article which has been expanded radially and has two or more, preferably three separately radially shrinkable sections. The article preferably comprises longitudinally separated pairs of electrodes (one pair for each separately radially shrinkable section) arranged to shrink each of the sections. The separately radially shrinkable sections may be separated by corrugated wall sections. One example of such an article is for cable blocking a cable splice, e.g. a splice between optical fibres. For this application there are three separately radially shrinkable sections. The central section contains a large mass of adhesive or other sealant, for cable blocking. The end sections are lined with adhesive, e.g. a hot melt adhesive, for bonding to the cable, or other substate.

For cable blocking and similar applications, there is not necessarily a requirement for the inner surface of the article to smooth (since the substrate may not be). Thus in the preferred case where the electrodes are provided on heat stable flanges projecting from the surface of the article (as described in U.S. patent application Ser. No. 07/241,749. These flanges may project outwardly from or inwardly into the article or both.

Another preferred article, which is recoverable, comprises a conductive polymeric hold-out layer which holds in a stretched state an elastomeric layer. The hold-out layer may be the inner or outer layer. The elastomeric layer is allowed to recover when the conductive layer heats.

In articles according to the invention, the wall thickness of the article may be varied along its length. Also two or more layers of different materials may be used. The second or additional layer may extend along the whole or along only part of the length of the article. They may have electrical properties e.g. room temperature resistivity and resistivity/temperature behaviour, that is the same as, or different to, that of the first material. As an example, the second or subsequent layers may comprise a material that exhibits traditional PTC behaviour or ZTC behaviour (zero temperature coefficient of resistivity). The effect of the additional layer(s) is that it (they) provide additional material through which electrical current can flow, and hence provide additional heating. By appropriate choice of the resistivity of the material of the additional layer(s) greater heating can be achieved than would be the case were a similar additional thickness of the first material used. This may be advantageous, for example to decrease recovery times in certain regions, or where a higher temperature is required. Therefore in some embodiments second or subsequent layers of material different to the first material are added in selected regions.

Another example of using two layers of different materials is where certain properties, e.g. flame retardancy, solvent resistance, abrasion resistance, electrical insulation, impact resistance, colour coding are required. Where two or more layers are used these may be applied separately, for example by sequential extrusion, or may be co-extruded.

Where the article is tubular, with one or more open ends, it may be desirable to seal between two or more substrates exiting the open end. This can be achieved using a branch off clip (e.g. as disclosed in U.S. Pat. No. 4,648,924) which brings together circumferentially spaced portions of the walls of the article between the substrates. Alternatively an electrically-heated filling piece may be used. The electrically heated clip or filling piece may be powered by the same power supply that is used to heat and recover the article.

The present invention may be utilised in a variety of articles or different shapes which are generally tubular and may be open at one or both ends.

Articles according to the invention may be coated on their internal and/or external surfaces with adhesive and/or sealant.

The article according to the invention may be made by any suitable method, e.g. by moulding.

Embodiments of the invention are now described, by way of example, with reference to the drawings, wherein.

Figure 1A:
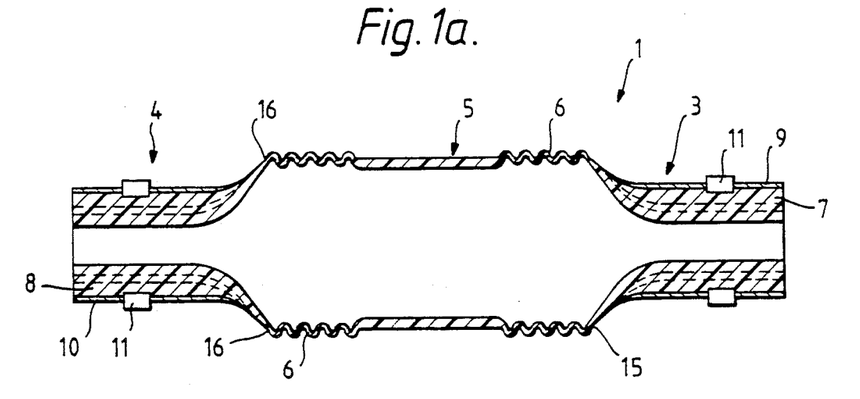
FIGS. 1a and 1b are longitudinal sections through an article according to the invention before and after expansion respectively.
Figure 1B:
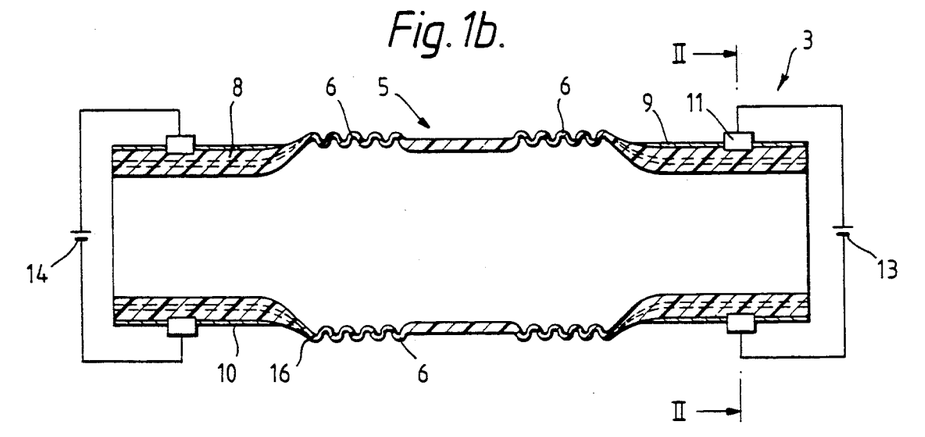
Figure 2:
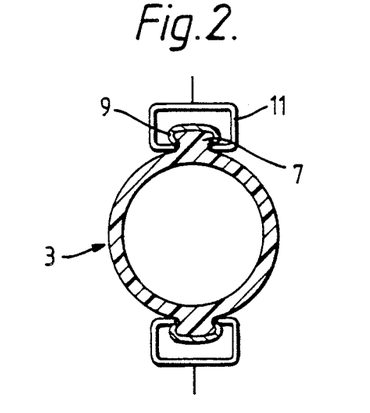
FIG. 2 is a cross-section through line II of FIGS. 1b.

Referring to the drawings, FIGS. 1a and 1b show (in longitudinal section) tubular article 1 comprising end section 3 and 4 and intermediate main body section 5 before and after expansion respectively; and FIG. 2 shows the article in cross-section. End sections 3 and 4 are expanded $Y_1\%$ and $Y_2\%$, and main body section is expanded X %, where $Y_1$ and $Y_2$ may be the same or different and are greater than X. Preferably X is substantially zero. At either end of main body section 5, a short distance from the boundary between sections 3 and 5 and 4 and 5 is a convoluted section 6. The convolutes extend around the circumference of the article. The wall thickness of the article and its convoluted arrangement provides flexibility.

The articles comprises a conductive polymeric material which in its expanded state is heated recoverable and exhibits a pseudo PTC ratio of about 5. The material also decreases in resistivity when expanded from X % to $Y_1\%$ or $Y_2\%$. Pairs of longitudinal flange support elements 7 and 8, which also comprise conductive polymeric material extend on opposite sides of the article, along end sections 3 and 4 respectively, but not along body section 5. Silver electrode strips 9 and 10 are painted on the flanges 7 and 8 respectively and extend a short distance onto main body section 5 to abut the thinner walled convoluted section 6. Electrodes 9 and 10 terminate in a body of conductive polymeric material defining inwardly directed electrode ends 15 and 16. The silver strips 9 and 10 are connected by crocodile clips 11 to 50 V power souces 13 and 14 respectively. The cross-section shape of the flange 7 (see FIG. 2) is such as to facilitate connection of the crocodile clips 11.

To recover the article onto a substrate, the electrodes are powered by power sources 13 and 14, at the same or different times causing current to flow around the circumference of the article between the electrodes, thereby heating the article and effecting recovery.

On recovery three features act to shunt current away from the inwardly directed electrode ends 15, 16 where it might otherwise be expected to concentrate, since it is an electrode ending in a body of conductive polymeric material, and hence a potential point of higher current density. First the thin walled convoluted section abuts the inwardly directed electrode ends 15 and 16, increasing the resistance. Second the material at the inwardly directed electrode end is less expanded than that adjacent the body of the electrode. This means that the material adjacent to the electrode end has a higher resistivity and hence a higher electrical resistance to current flow than the material adjacent the body of the electrode. Third of PTC effect, which comes into effect once heating starts, will increase the resistivity at the inwardly directed electrode ends 15 and 16, relative to adjacent areas, if the material at those ends becomes hotter than adjacent areas.

Figure 3:
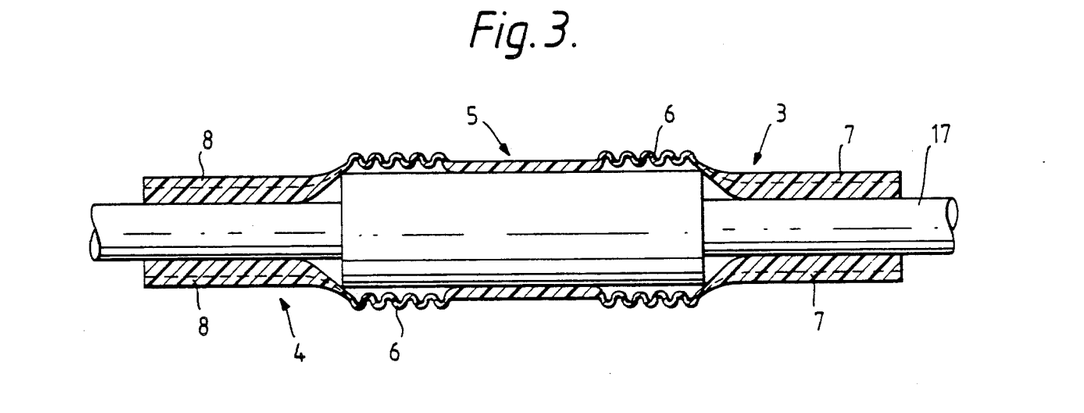
FIG. 3 shows the article of FIG. 1 and 2 recovered onto a substrate of non-uniform cross-section.

FIG. 3 shows the article of FIGS. 1 and 2 recovered onto a shaped substrate 17.

Figure 4:
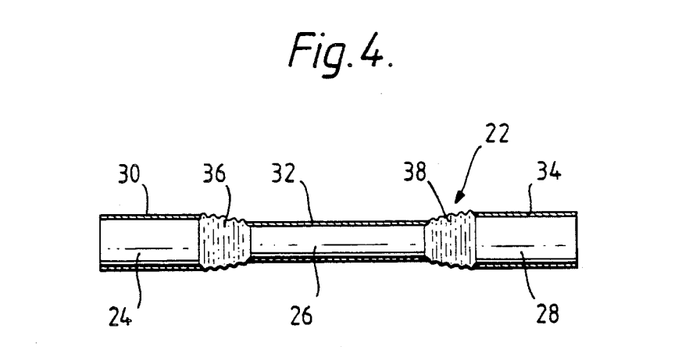
FIG. 4 shows another article according to the invention.

FIG. 4 shows another tubular article 22 according to the invention. It comprises three radially shrinkable sections 24, 26, 28 which are electrode by separate pairs of electrodes 30, 32, 34. The sections 24, 26, 28 are longitudinally separated by corrugated regions 36, 38. All three sections are lined with adhesive (not shown) and central section 26 contains a large mass of sealant. In use, cables to be spliced and sealed are inserted through ends 24 and 28 into the central section 26. The electrodes 32 on the central section section 26 are connected to an electrical power source causing it to heat, the sealant to flow and block the cables, and the section 26 to recover, and the electrodes 30, 34 on end sections 24 and 28 are connected to the source of electrical power to heat and recover those end sections into sealing engagement with the cables. Sections 24, 26, 28 may be heated and/or recovered in any order or substantially simultaneously.

The disclosures of the following copending, commonly assigned United States Patent Applications filed contemporaneously herewith are also incorporated herein by reference: Ser. Nos. 07/241,749; 07/242,081; 07/241,659; 07/241,643; 07/241,658; and 07/241,660.

I claim:

1. A heat-recoverable article comprising
   (1) and element which
      (a) is laminar,
      (b) is composed of a conductive polymer,
      (c) has been rendered heat-recoverable by an expansion process, and
      (d) can be caused to recover by passing electrical current through the element, thus generating heat which causes recovery of the element; and
   (2) two or more elongate electrodes,
      (a) each electrode having two free ends and a main body between the free ends,
      (b) at least one of the electrodes having an inwardly directed free end which does not terminate at an edge of the laminar element, and
      (c) the electrodes being laterally spaced apart from each other so that, when they are electrically connected to a source of electrical power, current flows between the electrodes through the laminar element, a substantial proportion of the electrical current flowing in a direction which is substantially parallel to the faces of the laminar element.

2. An article according to claim 1 wherein the resistivity of the conductive polymer in a region adjacent to the said inwardly directed free end of the electrode is greater than the resistivity of the conductive polymer in a region adjacent to the main body of the electrode.

3. An article according to claim 1, wherein a portion only of the sheet has been expanded.

4. An article according to claim 2 wherein the sheet has been expanded more in the region adjacent the free end of the electrode than in the region adjacent the main body of the electrode.

5. An article according to claim 1, wherein the conductive polymer is one whose resistivity, measured in the direction of expansion, decreased during at least part of the expansion process.

6. An article according to claim 1 wherein, in the region adjacent at least one of the electrodes, the conductive polymer adjacent the inwardly directed electrode end has been expanded less than the conductive polymer adjacent the main body of the electrodes.

7. An article according to claim 6 wherein the conductive polymer in the region adjacent the inwardly directed electrode end has a higher resistivity than the conductive polymer in the region adjacent the main body of the electrode.

8. An article according to claim 1 wherein the conductive polymer has a resistivity, as measured in the direction of current flow in the area of recovery as the element is caused to recover by connecting the electrodes to a suitable power source, which increases during at least part of the recovery process.

9. An article according to claim 1 wherein the conductive polymer element is thinner in one part than in another part.

10. An article according to claim 9, wherein, in the region adjacent at least one of the electrodes, the conductive polymer element in the region adjacent the inwardly directed electrode end is thinner than the conductive polymer element in the region adjacent the main body of the electrode.

11. An article according to claim 9, wherein the thinner part of the conductive polymer element is convoluted.

12. An article according to claim 1 wherein the conductive polymer exhibits a pseudo PTC ratio in the range of 1.5 to 10.

13. An article according to claim 1, wherein the conductive polymer element includes support elements which remain substantially underformed on recovery and to which the electrodes are attached.

14. An article according to claim 1, wherein the laminar conductive polymer element is tubular and radially recoverable, and the electrodes are longitudinal electrodes extending at least part way along the length of the laminar element, so that, when the electrodes are connected to a source of electrical power, current flows around the circumference of the tubular element.

15. An article according to claim 14 comprising two or more longitudinally spaced pairs of elongate electrodes, each pair comprising an electrode of opposite polarity and being arranged to direct a substantial proportion of the current around the circumference of the tubular element.

* * * * *

UNITED STATES PATENT AND TRADEMARK OFFICE
CERTIFICATE OF CORRECTION

PATENT NO. : 5,117,094
DATED : May 26, 1992
INVENTOR(S) : Jensen

It is certified that error appears in the above-indentified patent and that said Letters Patent is hereby corrected as shown below:

Title Page, Foreign Application Priority Data [30], line 2, replace "Oct. 9, 1987 [GB] United Kingdom 8721180" by --Sep. 9, 1987 [GB] United Kingdom 8721180--.

Title Page, Cited References [56], U.S. PATENT DOCUMENTS, before "4,775,501" insert
```
      --2,027,962  01/1936   L. M. Currie        18/55
        3,086,242  04/1963   P. M. Cook et al    18/1
        3,597,372  08/1971   P. M. Cook          260/4
        4,570,055  02/1085   McMills             219/541
                   FOREIGN PATENT DOCUMENTS
        1265194    03/1972   Great Britain
        157640     10/1985   EPC
        158410     10/1985   EPC
                   OTHER DOCUMENTS
```
Defensive Publication No. T905,001, published 12/19/72--.

Column 9, line 15 replace "articles" by --article--.

UNITED STATES PATENT AND TRADEMARK OFFICE
CERTIFICATE OF CORRECTION

PATENT NO. : 5,117,094

DATED : May 26, 1992

INVENTOR(S) : Jensen

It is certified that error appears in the above-indentified patent and that said Letters Patent is hereby corrected as shown below:

Column 9, line 16, replace "heated" by --heat--.

Column 9, line 51, replace "of" by --the--.

Column 9, line 60, replace "electrode" by --electroded--.
Column 10:
Claim 1, line 2, replace "and" by --an--.

Signed and Sealed this

Twenty-first Day of December, 1993

Attest:

BRUCE LEHMAN

Attesting Officer     Commissioner of Patents and Trademarks